UNITED STATES PATENT OFFICE.

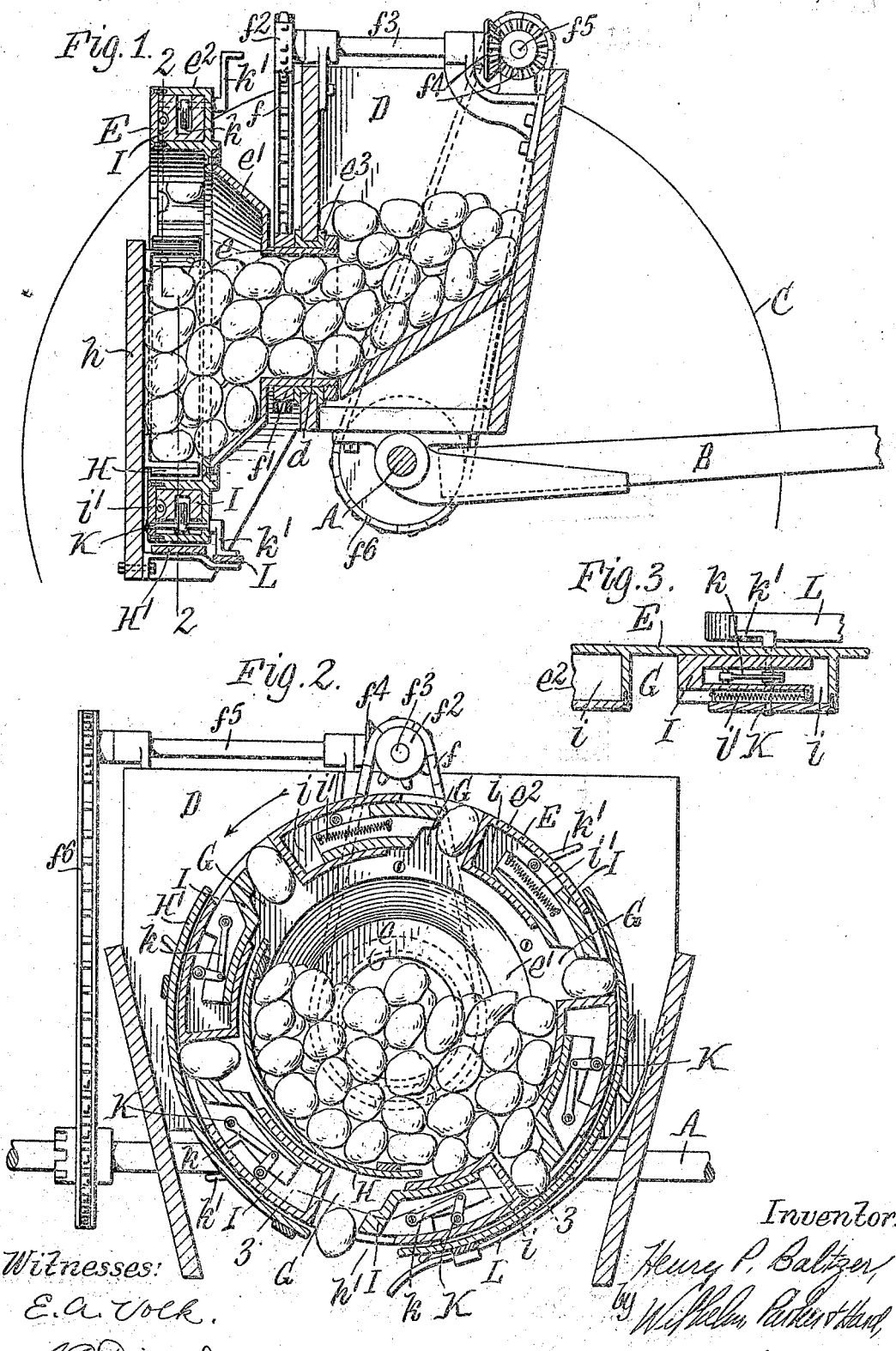

HENRY P. BALTZER, OF HAMBURG, NEW YORK.

POTATO-PLANTER.

951,412. Specification of Letters Patent. Patented Mar. 8, 1910.

Application filed October 5, 1908. Serial No. 456,112.

*To all whom it may concern:*

Be it known that I, HENRY P. BALTZER, a citizen of the United States, residing at Hamburg, in the county of Erie and State of New York, have invented a new and useful Improvement in Potato - Planters, of which the following is a specification.

This invention relates more particularly to potato feed or dropping mechanisms for potato planters of that sort having a rotary feed wheel or device which takes the potatoes from a hopper or receptacle and drops them at suitable distances apart for the hills.

The objects of the invention are to provide an efficient feeding or dropping mechanism of simple and inexpensive construction, which will insure the potatoes being dropped at equal distances apart without missing, and only one at a time; also to provide the feed or dropping device with potato holders which will positively hold and carry the potatoes, one at a time, from the hopper without bruising them; also to construct the mechanism so that the device can be seen and its action observed at all times; and also to improve feeding or dropping mechanisms of this sort in the respects hereinafter described and set forth in the claims.

In the accompanying drawings: Figure 1 is a longitudinal sectional elevation of a potato feed or dropping mechanism embodying the invention. Fig. 2 is a transverse sectional elevation thereof in line 2—2, Fig. 1. Fig. 3 is a fragmentary sectional plan thereof in line 3—3, Fig. 2.

Like letters of reference refer to like parts in the several figures.

The invention is concerned only with the feed or dropping mechanism, and only such other portions of the planter are shown in the drawings as are necessary for an understanding of the construction and operation of the feed mechanism and its arrangement on the planter.

A represents the axle, B the tongue, and C one of the ground wheels of a potato planter. These, and the parts of the machine not shown, may be of any usual or suitable construction.

D represents a potato hopper or receptacle which may be constructed and mounted on the planter frame in any suitable manner. A circular hole $d$ is provided in one wall, preferably the rear wall of the hopper, through which the potatoes pass to the feed wheel or device, and the bottom of the hopper is preferably inclined and contracted toward this hole so as to properly direct the potatoes thereinto.

E represents a rotary annular feed device or wheel which is arranged vertically in rear of the potato hopper, or outside thereof at the side having the discharge hole $d$, with its central opening connecting with the discharge hole $d$ in such manner that the potatoes can pass from the hopper through said hole centrally into the feed wheel. In the construction shown, the feed wheel has a central cylindrical portion or hub $e$ projecting from one side thereof which enters the discharge hole $d$ of the hopper, a conical or flaring body portion $e'$, and an annular rim or peripheral portion $e^2$ which projects laterally to the other side of the wheel. A bearing ring or bushing $e^3$ is secured in the discharge hole $d$ of the hopper and the hub $e$ of the feed wheel bears and turns freely in this bushing. The feed wheel is driven by a sprocket chain $f$ passing around a toothed ring $f'$ on the hub of the feed wheel and around a sprocket wheel $f^2$ on a shaft $f^3$ which is suitably journaled on the potato hopper and is geared by bevel wheels $f^4$ to a second shaft $f^5$ which is also journaled on the hopper and is provided with a sprocket wheel connected by a chain $f^6$ to a sprocket wheel on the axle A of the planter.

The flaring body of the feed wheel and its rim form a relatively large central distributing chamber in the wheel into which the potatoes pass from the hopper D through the opening $d$ and hub of the wheel, and the rim of the feed wheel is provided with radial openings or pockets G, open at their inner and outer ends, each adapted to receive a potato from the central chamber of the wheel. A curved shield H supported by a suitable stationary part $h$ of the planter extends into the feed wheel over the lower portion of the wheel rim to close the inner ends of the potato pockets G and prevent the potatoes from falling into the pockets until the pockets pass the front end of the shield, that is, the right-hand end thereof in Fig. 2. A second curved shield H' secured to the support $h$ surrounds the lower portion of the feed wheel so that the potatoes can only drop from the pockets G through a discharge opening $h'$ provided in this outer shield H' beneath the inner shield H when the pockets are brought successively into register with this discharge opening.

I represents movable jaws or devices on the feed wheel which are projected into the potato pockets G after they pass the receiving position to positively retain the potatoes therein, and are retracted to release the potatoes when the pockets reach the discharge opening h'. In the construction shown, the jaws are slidably mounted in chambers i in the rim between the potato pockets, and springs i' connected at opposite ends to the jaws and the wheel rim tend to project one end of the plungers into the potato pockets G. Each jaw I is connected by a link k to an arm on a rock shaft K journaled in the wheel rim and provided at one end with an arm k' which coöperates with a stationary curved track L suitably supported adjacent to the feed wheel to control the action of the jaws.

The feed wheel turns in the direction indicated by the arrow in Fig. 2. As each potato pocket G reaches the discharge opening h' in the outer shield H', the jaw for said pocket is retracted by the engagement of its operating arm k' with the rear end of the track L, and when the pocket passes the forward end of the inner shield H a potato falls into the pocket from the central chamber of the wheel. The track L gradually recedes forwardly from the periphery of the wheel so that during the rotation of the wheel the arm k' can gradually swing outwardly and allow the spring i' to gradually project the jaw I into the potato pocket to grip the potato. After the arm k' clears the front end of the track L the potato will be firmly held in the pocket by the spring-operated jaw I until the pocket is brought, by the rotation of the feed wheel, into register with the discharge opening h' in the outer shield H', when the arm k' will again engage the rear end of the track and will be moved to retract the jaw, which releases the potato so that it can drop through the discharge opening h'. The pockets thus receive and discharge the potatoes in succession.

The potato pockets of the feed wheel are not large enough to hold more than one potato each (or one piece of potato when cut potatoes are used), and if two potatoes lodge in the same pocket the one that is not gripped by the jaw I will drop back into the central chamber of the feed wheel when the pocket is inverted in the rotation of the wheel, while the potato that is gripped by the jaw will be positively retained in the pocket, so that each pocket will receive and drop one potato, but no more than one, at a time. The central chamber of the feed wheel being of relatively large dimensions, forms a sort of supplemental hopper, and as this chamber revolves it agitates the potatoes, which insures the potatoes feeding properly from the hopper D into this chamber and the delivery of the potatoes from the chamber into the potato pockets. The feed device is therefore accurate and reliable in action. Furthermore, owing to the described construction and arrangement of the feed device in rear of the hopper, the operator can see into the same and ascertain whether the potatoes are feeding properly into the feed wheel and are being taken therefrom singly by all of the pockets or holders.

The upright annular revolving feed-device or wheel into which the potatoes are fed centrally and which has the peripheral holders or pockets for receiving and discharging the potatoes, is of prime importance, but this device can be rotatably mounted and driven in different ways and the construction of the wheel and of the holding jaws or devices and their actuating means can be changed without departing from the invention. The described mechanism can also be used for feeding material other than potatoes.

I claim as my invention:

1. The combination of an annular rotary feed wheel which is arranged in a substantially upright position and has a distributing chamber to which the potatoes are fed through the central opening of said annular wheel, and peripheral potato holders which surround said distributing chamber and receive the potatoes from the same and release them one at a time, substantially as set forth.

2. The combination of a hopper having a discharge opening, a rotary feed wheel having a distributing chamber communicating with said hopper through said discharge opening, and a rim surrounding said chamber and provided with a series of holders into which the potatoes enter from said distributing chamber, and means for operating said holders to receive the potatoes from said central chamber, retain them therein and successively discharge the same, substantially as set forth.

3. The combination of a hopper having a discharge opening, an annular feed wheel which is arranged in a substantially upright position and has a distributing chamber communicating with said hopper through the central opening of the wheel, which registers with said discharge opening of the hopper, and a series of peripheral potato holders which receive the potatoes from said distributing chamber, and means for operating said holders to retain the potatoes until the holders reach the discharging position, substantially as set forth.

4. The combination of a hopper having a discharge opening, a rotary feed wheel having a central distributing chamber communicating with said hopper through said discharge opening, and a series of peripheral potato pockets which receive the potatoes from said central chamber, and a shield providing a discharge opening with which said pockets are caused to register in succession by the rotation of said wheel and through which the potatoes discharge, substantially as set forth.

5. The combination of a hopper having a discharge opening, a rotary feed wheel having a central distributing chamber communicating with said hopper through said discharge opening, and a series of peripheral potato holders which receive the potatoes from said chamber, and a shield arranged outwardly beyond said holders and providing a discharge opening with which said holders are caused to register in succession by the rotation of said wheel and through which the potatoes discharge, substantially as set forth.

6. A feed device comprising an annular, rotary and substantially upright feed wheel having a central distributing chamber for the potatoes and a central opening through which the potatoes are received into said distributing chamber, a series of holders on the rim of said feed wheel around said distributing chamber which are open at the inner edge of the rim to receive the potatoes from said distributing chamber and are open at the outer edge of the rim to discharge the potatoes, and means for operating said holders in succession to release the potatoes, substantially as set forth.

7. A feed device comprising a rotary feed wheel having a central chamber for the potatoes, a series of radial open-ended potato pockets in the rim of said wheel into which the potatoes drop from said central chamber, spring-operated clamps for holding the potatoes in said pockets, and means for operating said clamps to release the potatoes and permit them to fall out of said pockets, substantially as set forth.

8. A feed device comprising an upright rotary annular feed wheel having open-ended potato pockets extending through the rim thereof and adapted to receive the potatoes from the central portion of the wheel, an inner shield arranged over a portion of said rim at the lower side of the wheel, an outer shield arranged beneath the lower portion of said rim and providing a discharge opening beneath said inner shield, devices for holding the potatoes in said pockets, and means for operating said devices to release the potatoes when said pockets register with said discharge opening, substantially as set forth.

9. The combination of a hopper having a discharge hole in one side, a rotary feed wheel having a hub which is journaled in said discharge hole and through which the material passes from said hopper into said wheel, said wheel having a central chamber surrounded by a rim provided with holders to receive the material from said central chamber, and means for operating said holders to retain the material until the holders reach the discharging position, substantially as set forth.

Witness my hand, this 23d day of September, 1908.

HENRY P. BALTZER.

Witnesses:
C. W. PARKER,
C. B. HORNBECK.